United States Patent [19]

Nabeshima et al.

[11] Patent Number: 5,418,663

[45] Date of Patent: May 23, 1995

[54] MAGNETIC REPRODUCING APPARATUS AND METHOD FOR HIGH SPEED SEARCH OF PROGRAM LEADING EDGE

[75] Inventors: Shigeki Nabeshima; Kenji Miyashita, both of Sanda, Japan

[73] Assignee: Mitsubishi Denki Kabushiki Kaisha, Tokyo, Japan

[21] Appl. No.: 904,042

[22] Filed: Jun. 18, 1992

[30] Foreign Application Priority Data

Jun. 19, 1991 [JP] Japan .................. 3-147540

[51] Int. Cl.$^6$ .............................................. G11B 15/48
[52] U.S. Cl. .................. 360/72.2; 360/72.1; 360/74.4
[58] Field of Search .............. 360/74.4, 73.04, 74.1, 360/72.1, 72.2, 72.3

[56] References Cited

U.S. PATENT DOCUMENTS

| 4,689,699 | 8/1987 | Harigaya et al. | 360/74.4 |
| 4,737,868 | 4/1988 | Kimura et al. | 360/74.4 |
| 4,837,640 | 6/1989 | Ozaki et al. | 360/72.2 |
| 4,958,244 | 9/1990 | Inazawa et al. | 360/72.1 |
| 5,274,513 | 12/1993 | Nakano et al. | 360/72.2 |

FOREIGN PATENT DOCUMENTS

| 0323910 | 7/1989 | European Pat. Off. . |
| 2417547 | 10/1974 | Germany . |
| 2659571 | 7/1978 | Germany . |
| 4015628 | 5/1990 | Germany . |
| 62-113943 | 5/1989 | Japan . |
| 1144285 | 6/1989 | Japan . |
| 1158652 | 6/1989 | Japan . |

*Primary Examiner*—Aristotelis Pstios
*Assistant Examiner*—James L. Habermehl

[57] ABSTRACT

A magnetic tape reproducing apparatus and method is capable of reliably detecting the leading edge of a program to be reproduced without any malfunction even at the time of a high-speed search. During a 200-times normal speed high-speed search in the reproducing direction of a magnetic tape derived from the drive of a feed reel 14 and a take-up reel 15, a microcomputer 27 applies a brake to both reels in response to the detection of a start ID by a rotary head 11. From this detection of the start ID until the stop of the tape, reel pulses input from sensors 16 and 17 (from the rotation of the reels) are counted. After the tape comes to rest, the tape is compulsority rewound at a lower speed (10-times speed) dependent on the counted number of the pulses. After the completion of the compulsory rewinding, a 10-times speed rewinding follows with the lead edge of the start ID being detected, thereby eliminating an unstable contact condition which may be produced between the rotary head 11 and the magnetic tape 12 immediately after the stoppage of the tape, and presenting a more accurate detection of the start ID.

16 Claims, 9 Drawing Sheets

MAGNETIC REPRODUCING APPARATUS AND METHOD FOR HIGH SPEED SEARCH OF PROGRAM LEADING EDGE

BACKGROUND OF THE INVENTION

1. Field of the Invention

The present invention relates to a magnetic tape reproducing apparatus for reproducing digital information such as music recorded on a magnetic tape.

2. Description of the Related Arts

An apparatus for digitally recording data onto a predetermined track of a magnetic tape has been put to practical use, which is known as, for example, an R-DAT (rotary digital audio tape recorder) system. This digital magnetic tape apparatus advantageously suffers less signal deterioration during recording or reproducing than the conventional analog recording system, and hence a variety of editing operations such as follow-up recordings, high-speed searches or selections of music using a sub-area as well as high-density recording can be easily performed. Accordingly, such a digital magnetic tape apparatus is applicable not only to audio recording, for example, in the R-DAT format described above, but also to recording or reproducing of graphics or other digital data.

Figure 7A:
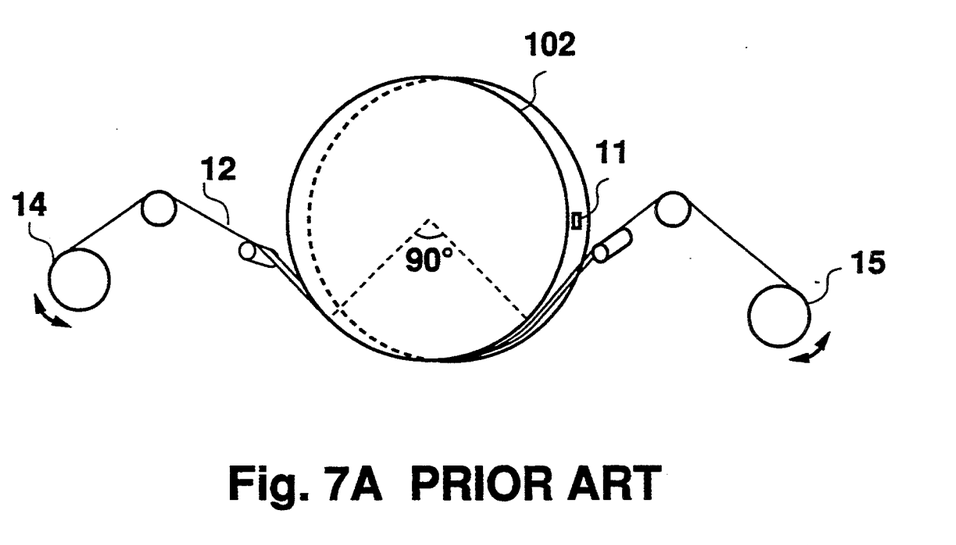
FIGS. 7A and 7B are explanatory drawings each showing the arrangement of a rotary drum relative to a magnetic drum in the magnetic tape reproducing apparatus.
Figure 7B:
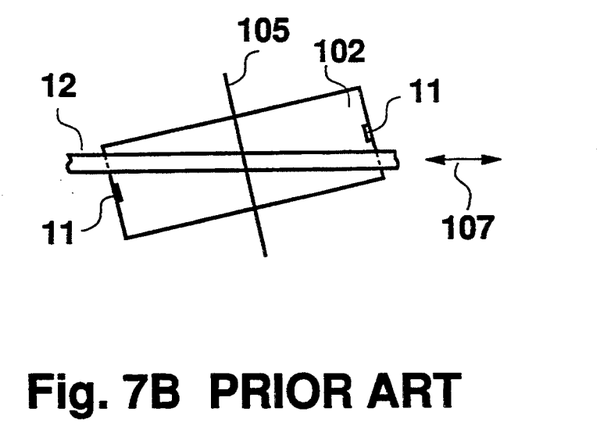

In such a digital magnetic tape apparatus represented by the R-DAT, commonly employed is a so-called helical scan method in which a rotary head scans diagonally relative to a running magnetic tape as shown in FIGS. 7A and 7B. In the drawings, a magnetic tape 12 is transferred from a feed reel 14 to a take-up reel 15 while being in contact with a cylindrical rotary drum 102 at a lap angle of 90°. The drum 102 has a rotational axis 105 which is slightly slanted with respect to the direction orthogonal to the tape running direction. A pair of magnetic heads 11, disposed on the circumferential surface of the rotary drum 102 diametrically opposite to each others are adapted to form linear elongated tracks on the magnetic tape 12 which are slightly inclined with respect to the tape running direction 107.

In the above-mentioned helical scan method, each of the tracks on the magnetic tape generally includes a tape format consisting of a PCM (main) area for digitally recording data and a sub-area for digitally recording sub-code signals representative of characteristics of the data, and is successively formed on the magnetic tape for the predetermined data recording.

Figure 8:
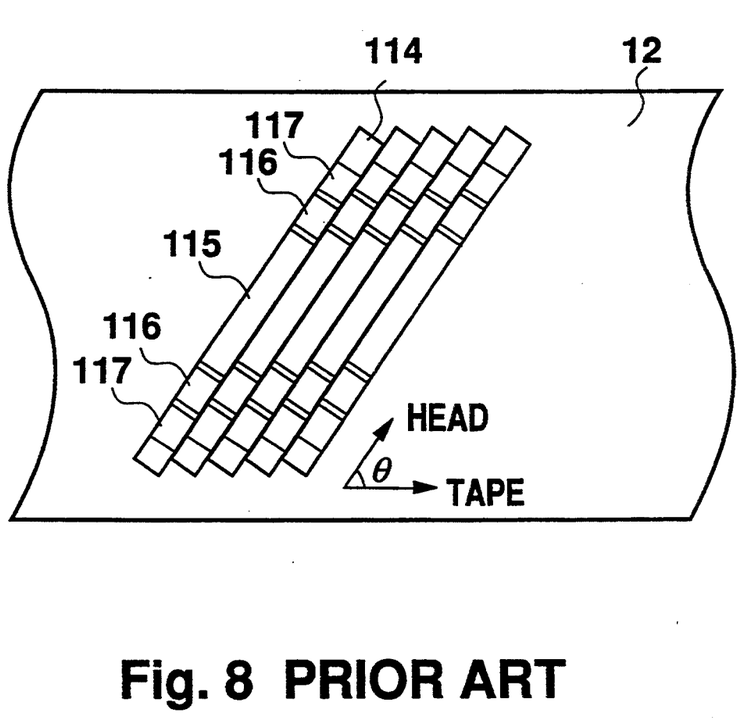
FIG. 8 is an explanatory drawing illustrating a recording format of the information to be reproduced from magnetic tape by the magnetic tape reproducing apparatus.

FIG. 8 depicts tracks formed on the magnetic tape 12. As is apparent from this drawing, the tracks 114 are successively formed on the magnetic tape 12 so as to define an angle relative to the tape running direction T. Each of the tracks 114 includes a centrally provided PCM area 115, ATF (automatic track finding) areas 116 provided adjacently on both sides of the PCM area, and sub-areas 117 further provided adjacent on both sides of the ATF areas 116. Among them, the PCM area 115 acts as a region where main signals are recorded as music data, the ATF area 116 serves as a region where information required for tracking is recorded, and the sub-area 117 functions as a region where program numbers representing the music numbers, start code signals representing initiating positions of the above-mentioned main signals (hereinbelow, referred to as start ID's), priority code signals, reproducing time information and the like are recorded. Each of the music data (hereinafter, referred to simply as programs) is adapted to be controlled by sub-code signals of the sub-code areas provided on each of the tracks, and the program numbers are one after another written into the sub-areas of the required track between each of the segmented data. Then, the program number is searched to select the desired program. In cooperation with a program memory storing these recording orders, a random high-speed search is also available.

The start code signal is called a start ID, which is one of the most important sub-code signals. This start ID is usually recorded for nine seconds at the head of music data for use in the reproduction or high-speed search. By way of example, when this signal is detected in the ordinary reproduction mode, a start indication lamp provided on, for example, a console is turned on during that detection, to display that the head of music data is present.

Figure 9:
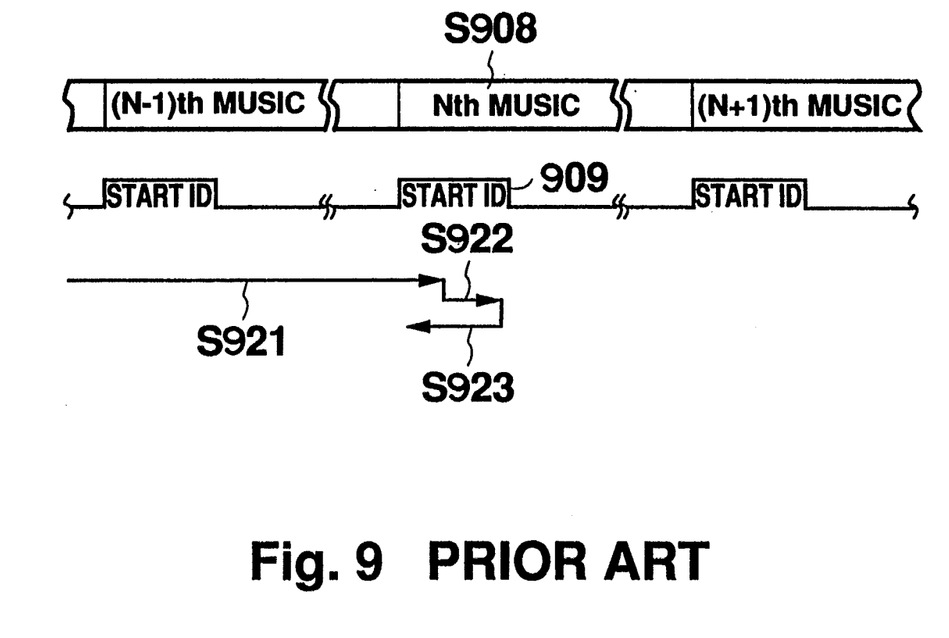
FIG. 9 is an explanatory drawing diagramatically illustrating the fast search operation in the reproducing direction in the conventional magnetic tape reproducing apparatus.

In the magnetic tape reproducing apparatus such as the RDAT, the program search has been hitherto carried out in the following manner. As shown in FIG. 9, when the N-th program 108 is searched for by a high-speed forward search (hereinafter, referred to as FF), the magnetic tape is first transferred at a speed 200 times the ordinary tape running speed while the start ID is being hunted (Step S 921). In this case, the tape is often found at a position beyond the rise position of the target start ID 109 due to a high-speed of the tape relative to the speed of rotation of the rotary drum 102. This detection brings about a braking action onto the take-up reel 15, and feed reel 14 (FIG. 7), and the tape comes to a stop after the predetermined distance of running (step S 922). Then, the fall (rise in the FF direction) position of the start ID 109, in other words, leading edge of the start ID is hunted (Step S 923) while the tape is being rewound at a speed in the order of 10 times the ordinary reproduction speed.

Thus, in the conventional magnetic tape reproducing apparatus, when the program is searched for by the high-speed search, the tape is reversed and the detection of the leading edge of the start ID is initiated immediately after the stop of the tape due to the braking action following the detection of the start ID. However, at the time when the force of the brake brings the tape to a stop, the tape may become loose due to the lag in the timing between the stop of the feed reel 14 and the stop of the take-up reel 15, which leads to an unstable contact with respect to the rotary drum 102. If the rotation of the tape is reversed to look for the start ID immediately under such conditions, a pseudo signal looking like the fall (leading edge) of the the start ID is liable to be detected, which may be mistaken for a true program leading edge. This prevents the target music from being reproduced from the beginning, and instead the reproduction may be disadvantageously initiated halfway through.

Thus, an object of the present invention is to overcome the above problems.

The present invention was conceived in order to solve the above problems, and aims at providing a magnetic tape reproducing apparatus capable of accurately detecting the leading edge of the program for the reproduction, without any malfunction even during high-speed search.

SUMMARY OF THE INVENTION

According to a first aspect of the present invention, there is provided an apparatus for reproducing information from a magnetic tape including at least one piece of program information such as digitized music data and including start information recorded over a predetermined interval for respective program information so as to indicate a leading edge or an initiation point of the program information, comprising:

a high-speed feed means for feeding the magnetic tape in a reproducing direction at a relatively high first tape running speed;

a rewinding means for rewinding the magnetic tape in the reverse direction to the reproducing direction at a second tape running speed lower than that of the high-speed feed means;

a detection means for detecting start information from the magnetic tape;

a tape stop means for stopping the running of the magnetic tape when the start information is detected by the detection means during the high-speed feed of the magnetic tape in the reproducing direction caused by the high-speed feed means;

an overrun distance measuring means for measuring an overrun distance required for the magnetic tape to come to rest after the detection of the start information; and a tape running control means for issuing instructions to the rewinding means and detection means after the stop of the magnetic tape to compulsorily rewind the magnetic tape by at least the overrun distance without performing the detection of the start information, and then to rewind the magnetic tape up to the leading edge of the start information while looking for the start information.

This structure securely restores a stable contact state from an unstable contact state which may exist between the magnetic head and the tape immediately after stopping the tape, by compulsorily rewinding at a lower speed by a distance corresponding to the overrunning from the detection of the start information up to the stop of the tape when a music program is searched for at a higher speed in the reproducing direction. Furthermore, after securing this stable condition, the subsequent low-speed rewinding operation is executed to detect the leading edge of the start information. This ensures an errorless detection of the leading edge of the start information as well as an accurate detection of the header of the music program.

In accordance with another aspect of the present invention, there is provided an apparatus for reproducing information from a magnetic tape including at least one piece of program information such as digitized music data and including start information recorded over a predetermined interval for respective program information so as to indicate a leading edge or an initiation point of the program information, comprising:

a high-speed rewinding means for rewinding the magnetic tape in the reverse direction to a reproducing direction at a first tape running speed;

a low-speed rewinding means for rewinding the magnetic tape in the reverse direction to the reproducing direction at a second tape running speed lower than that of the high-speed feed means;

a low-speed feed means for feeding the magnetic tape in the reproducing direction at a tape running speed substantially equal to that of the low-speed rewinding means;

a detection means for detecting start information from the magnetic tape;

a tape stop means for stopping the running of the magnetic tape when the start information is detected by the detection means during the high-speed rewinding of the magnetic tape; and a tape running control means for issuing an instruction to the low-speed rewinding means and the detection means to compulsorily rewind the magnetic tape without any detection of the start information for a further predetermined distance from the position of the stop caused by the tape stop means, and for issuing an instruction to the low-speed rewinding means and the detection means to rewind the magnetic tape up to the leading edge of the start information while detecting the start information when the position where the rewinding for the predetermined distance has been completed lies within the section where the start information is situated, and for issuing an instruction to the low-speed feed means and the detection means to transfer the magnetic tape up to the leading edge of the start information while detecting the start information when the position where the rewinding for the predetermined distance has been completed lies outside the section where the start information is situated.

This structure securely restores a stable contact state from unstable contact state which may exist between the magnetic head and the tape immediately after stopping the tape, by compulsorily rewinding at a lower speed by a predetermined distance following the tape stoppage when a music program is searched for at a higher speed in the rewinding direction. Furthermore, after securing this stable condition, the subsequent low-speed rewinding operation is executed to detect the leading edge of the start information. This ensures an errorless detection of the leading edge of the start information as well as an accurate detection of the header of the music program.

DESCRIPTION OF THE PREFERRED EMBODIMENTS

Embodiments of the present invention will be hereinbelow described in detail.

Figure 1:
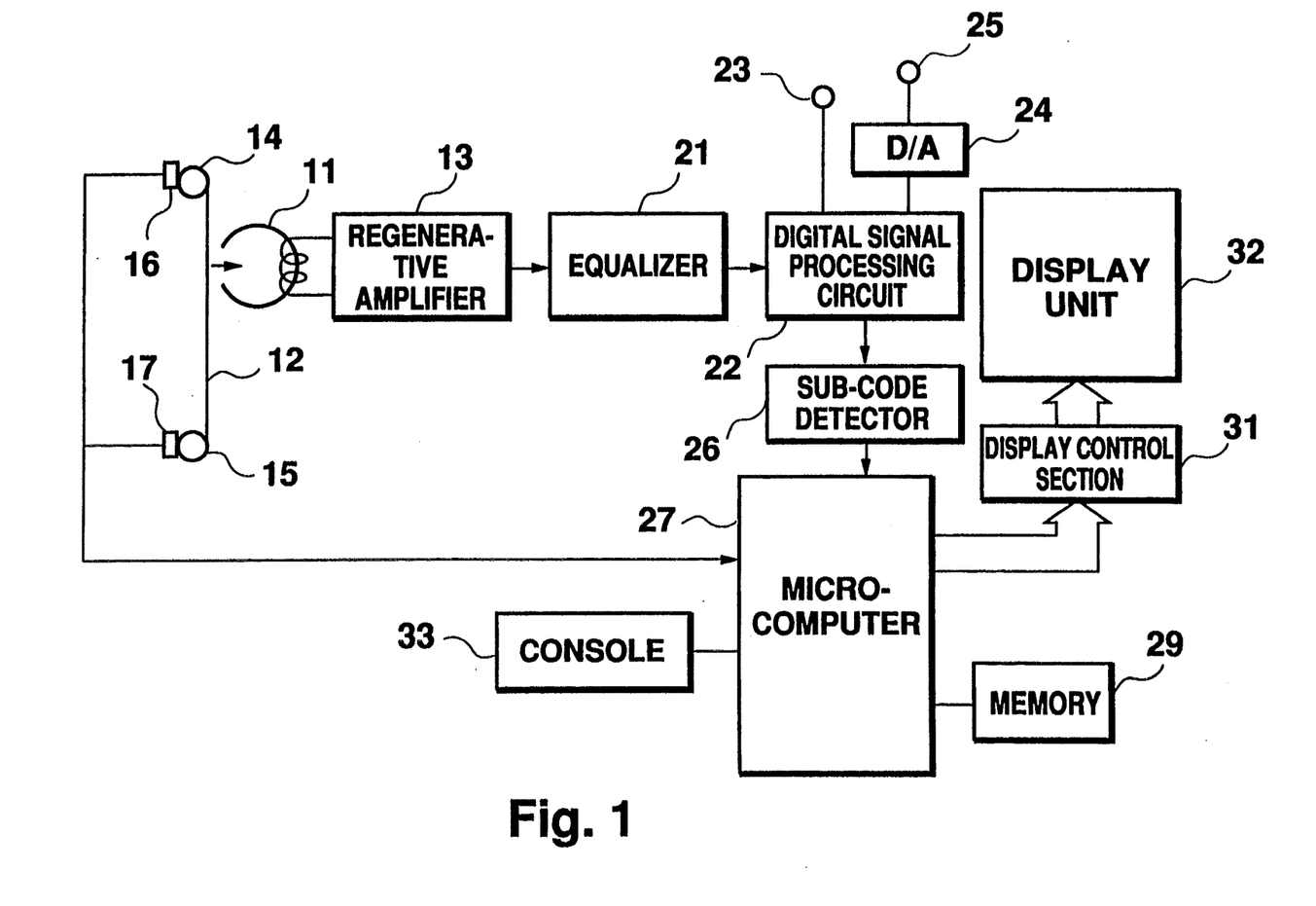
FIG. 1 is a block diagram showing the principal parts of a magnetic tape reproducing apparatus in accordance with an embodiment of the present invention.

FIG. 1 illustrates a principal part of a magnetic tape reproducing apparatus in accordance with an embodiment of the present invention.

A rotary head 11 carried by a rotary drum 102 as shown in FIG. 7 traverses a magnetic tape 12 for helical scanning at a predetermined angle with respect to the running direction thereof (FIG. 7b) while maintaining contact with the magnetic tape 12. At the time of reproduction, the magnetic tape 12 is transferred from a feed reel 14, rotationally controlled by a drive motor not shown, to a take-up reel 15, and data are successively read from tracks 114 of the magnetic tape 12 (FIG. 8) to be input into a regenerative amplifier 13. The feed reel 14 and the take-up reel 15 are fitted with sensors 16 and 17, respectively, which supply signals whose number depend on their respective speeds of rotation to a microcomputer 27.

The signals amplified by the regenerative amplifier 13 (FIG. 1) are subjected to an equalizing process by an equalizer 21 after demodulation, and then transmitted to a digital signal processing circuit 22. The reproduction signals input into the digital signal processing circuit 22 undergo a predetermined signal processing, and are directly output from a digital output terminals 23 in the form of digital signals, or alternatively, sent out from an analog output terminals 25 in the form of analog signals by way of a D/A converter 24.

The digital signal processing circuit 22 is connected to a sub-code detector 26 which detects a variety of sub-code signals from the reproduction signals input into the digital signal processing circuit 22 for transmission to the microcomputer 27. The microcomputer 27 executes not only control of operations such as reproducing, recording and fast searching as well as selection of reproduction modes based on an instruction derived from a console 33, but also control of a display control section 31 based on the sub-code signals detected by the sub-code detector 26 for display of information such as a program number under reproduction or search and a reproduction elapsed time by way of a display unit 32. Furthermore, the microcomputer 27 is linked with a memory 29 which stores various programs or data associated with the reproducing or recording operation.

Figure 2:
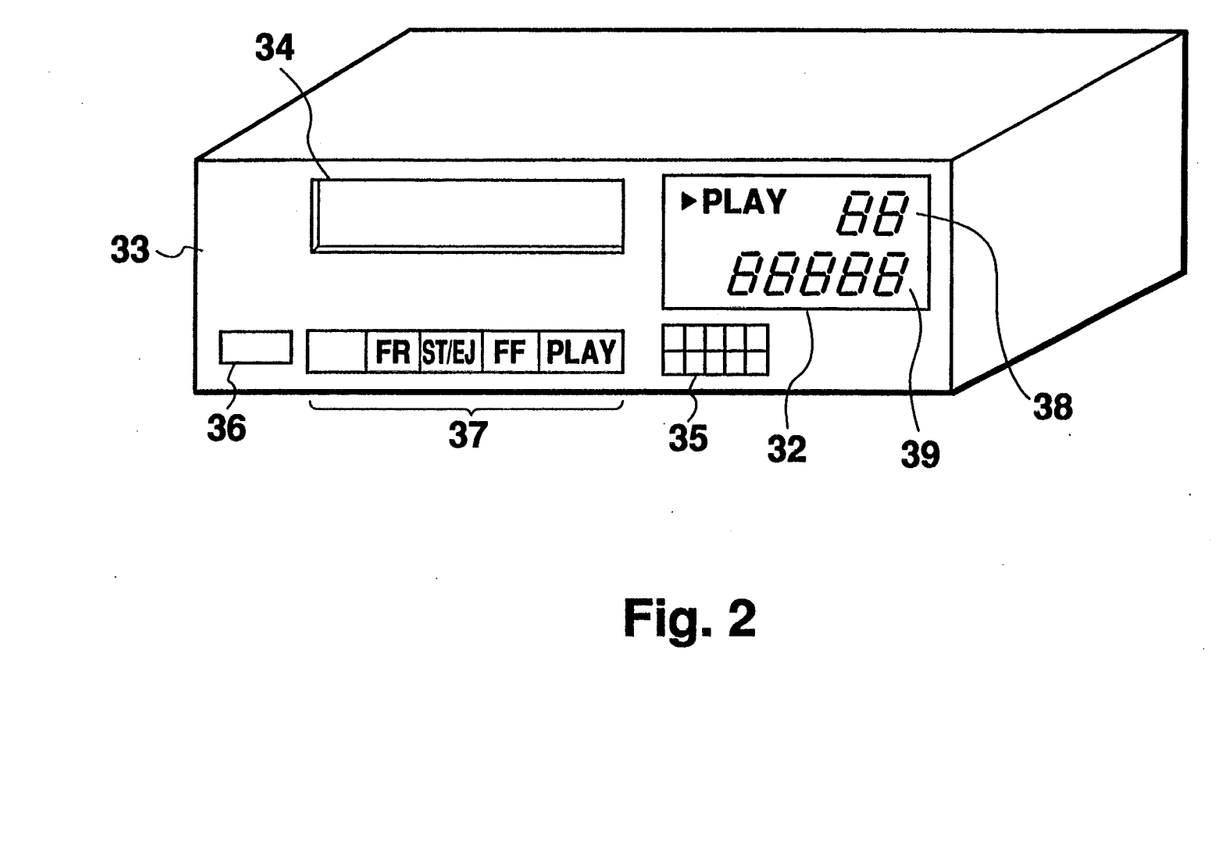
FIG. 2 is a perspective view showing an outward appearance of the magnetic tape reproducing apparatus.

FIG. 2 depicts an outward appearance of the magnetic tape reproducing apparatus. The console 33 of this apparatus comprises an insertion slot 34 for loading or unloading a magnetic tape cassette, a power supply switch 36 for supplying electric power to the apparatus, a display 32 for displaying a variety of information, a plurality of operation keys 37, and a numerical key pad 35 for the input of numerical data. The operation keys may include, for example, a reproduction key, a stop/ejection key and a recording key in addition to a fast search key (FF key) in the forward or reproducing direction and a fast search key (FR key) in the reverse or rewinding direction.

The display unit 32 may be, for example, a liquid-crystal display (LCD) or an LED display, on which the following display appears.

(1) "PLAY": represents that the tape is being reproducted.

(2) First 7 segment display section 38: displays a program number being reproducted or the like, where a two-digit display is available.

(3) Second 7 segment display section 39: displays a reproduction time or the like, where a five-digit display is available.

The operation of the thus configured magnetic tape reproducing apparatus will now be described according to both cases of a fast forward search (FF search) in the reproducing direction and a fast reverse search (FR search) in the rewinding direction.

FF search operations

Figure 3:
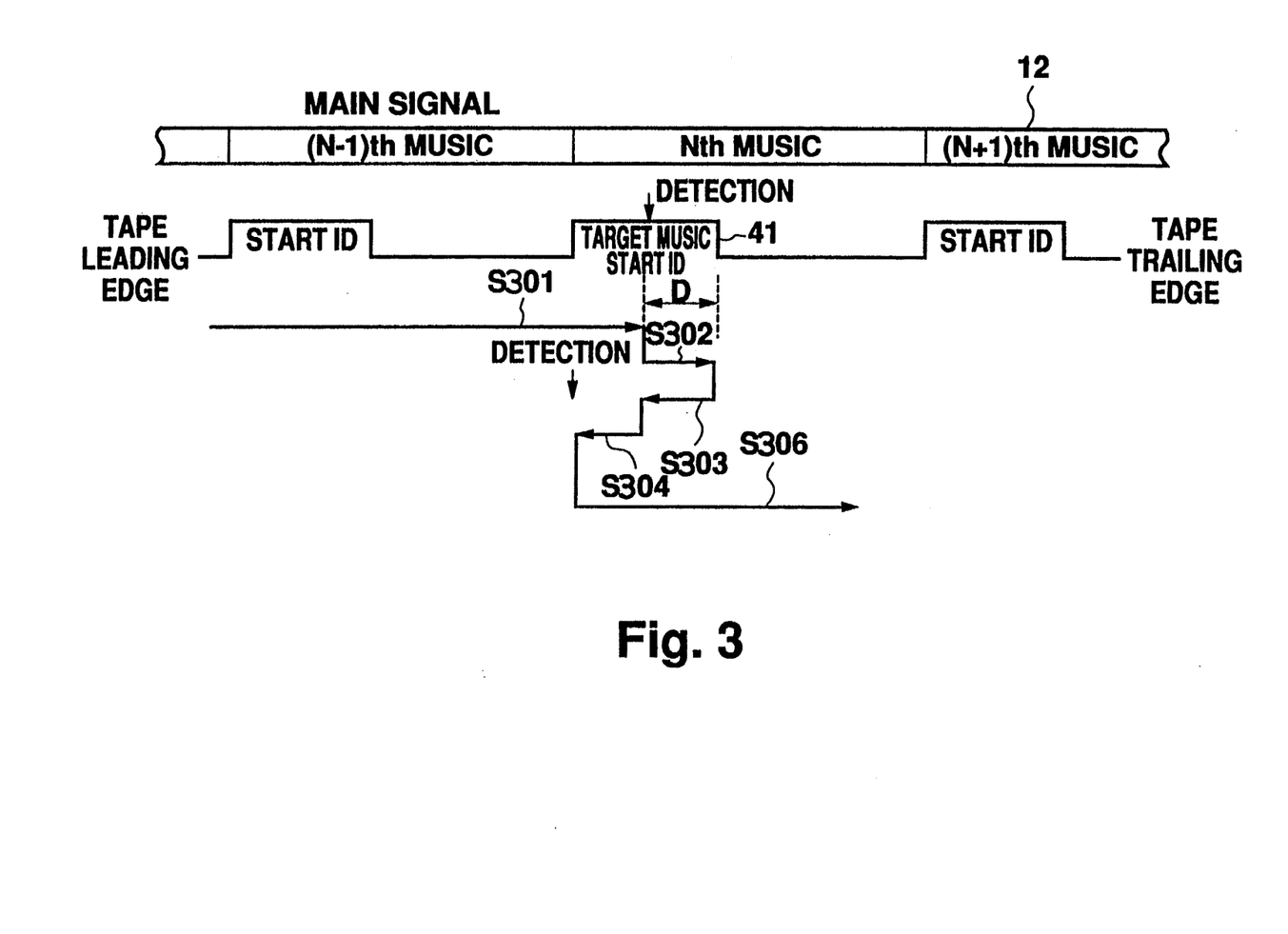
FIG. 3 is an explanatory drawing diagramatically illustrating the fast search operation in the reproducing direction in the magnetic tape reproducing apparatus.

FIG. 3 diagramatically shows operations at the time of the fast search in the reproducing direction. Herein, the description will be made of the case where an N-th program stored on the magnetic tape 12 is to be searched for at high speed.

A start ID is first detected while forwarding the magnetic tape 12 at a speed 200 times the ordinary tape running speed (Step S301 in FIG. 3). In this case, a target start ID 41 is detected at a position beyond the leading edge thereof since the ID is caused to overrun due to the high running speed of the tape relative to the rotational speed of the rotary drum. This detection brings about a braking action onto the feed reel 14 and the take-up reel 15 to thereby stop the tape after additional running by a determined distance D (Step S302). At that time, the additional running distance D required for the tape to come to rest after the detection of the start ID is measured by the microcomputer 27 in compliance with reel pulses from sensors 16 and 17 (FIG. 1).

Afterwards, the magnetic tape 12 is rewound by the distance D in a reverse mode at a speed about 10 times the ordinary reproducing speed (Step S 303). It should be noted that this operation is compulsorily performed without the detection of the start ID, in accordance with the reel pulses from the sensors 16 and 17. At the time when the tape has been rewound by the distance D, the detection of the start ID is restarted with the rewinding operation under the reverse mode continues (Step S 304). When the beginning of the start ID is thus detected, the magnetic tape comes to an end (Step S 305). In this manner, the initiation point of the start ID 41 is found and is followed by the reproducing operation (Step S 306). The detection of the leading edge of the start ID can be reliably effected due to a relatively low rewinding speed in the order of 10 times the ordinary tape running speed as described hereinbefore.

Figure 4:
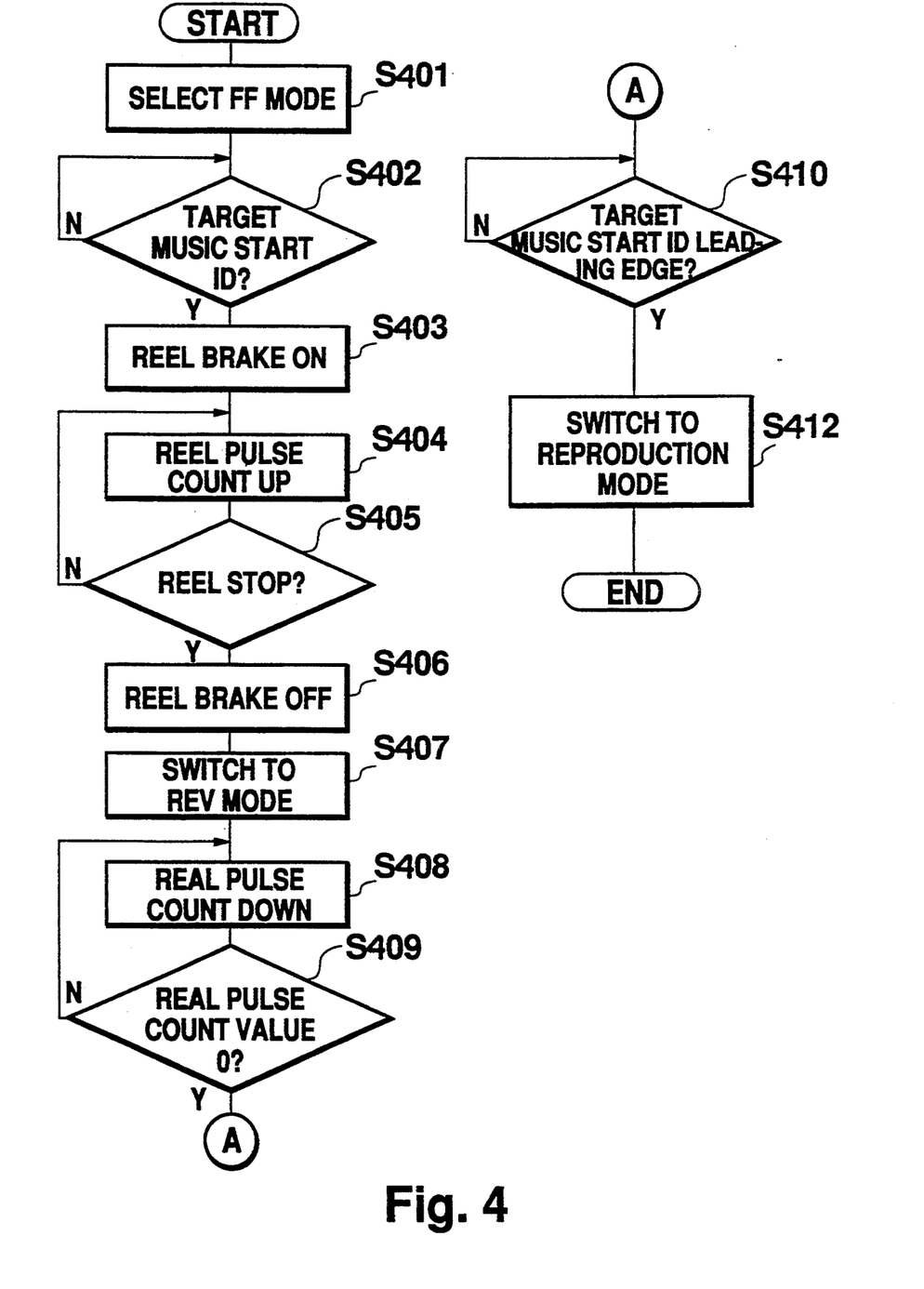
FIG. 4 is a flowchart for detailing the fast search operation in the reproducing direction in the magnetic tape reproducing apparatus.

The above operation will be further explained in detail with reference to FIG. 4. When a desired program number is input through a numerical key pad 35 provided on a console 33 (FIG. 2) and then the FF key is depressed (Step S 401), the microcomputer 27 (FIG. 1) detects it to initiate a 200-times speed search (FF search) in the reproducing direction. During this operation, the microcomputer 27 executes the detection of the target start ID 41 by means of a sub-code detector 26 (Step S 402). If the start ID 41 is detected (Step S 402; Y), then the microcomputer 27 actuates a reel brake not shown (Step S 403) whereas a counter not shown commences to count the number of reel pulses transmitted in accordance with the speed of rotation of the reel from the sensors 16 and 17 (Step S 404).

When the rotation of the feed reel 14 and the take-up reel 15 stops to bring the running of the magnetic tape 12 to an end (Step S 405; Y), the microcomputer releases the reel brake (Step S 406) and stores the counted value at that point.

Subsequently, the microcomputer 27 switches its mode into a reverse mode executing the rewinding at a speed about ten times the ordinary reproducing speed (Step S 407) to thereby start the rewinding operation of the tape. Then, the microcomputer 27 decreases one by one the above-described counted value being stored in the counter each time a reel pulse is input from the sensors 16 and 17 thereinto (Step S 408), and allows the tape to be rewound until the value of the counter reaches "0" (Step S 409; Y). At that time, the start ID 41 is not detected as described above. In other words, the rewinding of the magnetic tape 12 is compulsorily effected by the distance D corresponding to the value being stored in the counter, thereby removing any looseness of the tape which may take place at the stoppage of the tape and ensuring a stable contact of the tape with respect to the rotary drum and the rotary head 11 (FIG. 1).

When the value of the counter reaches "0", the microcomputer resumes detecting the start ID 41 while still in the reverse mode. Then, since the rewinding speed is in the order of 10 times the ordinary reproducing speed, the leading edge of the start ID 41 can be reliably detected. The leading edge of the start ID 41 is thus detected (Step S 410; Y), the microcomputer 27 switches its mode into the ordinary reproducing mode (Step S 412) to initiate the reproduction.

FR Search Operations

Figure 5:
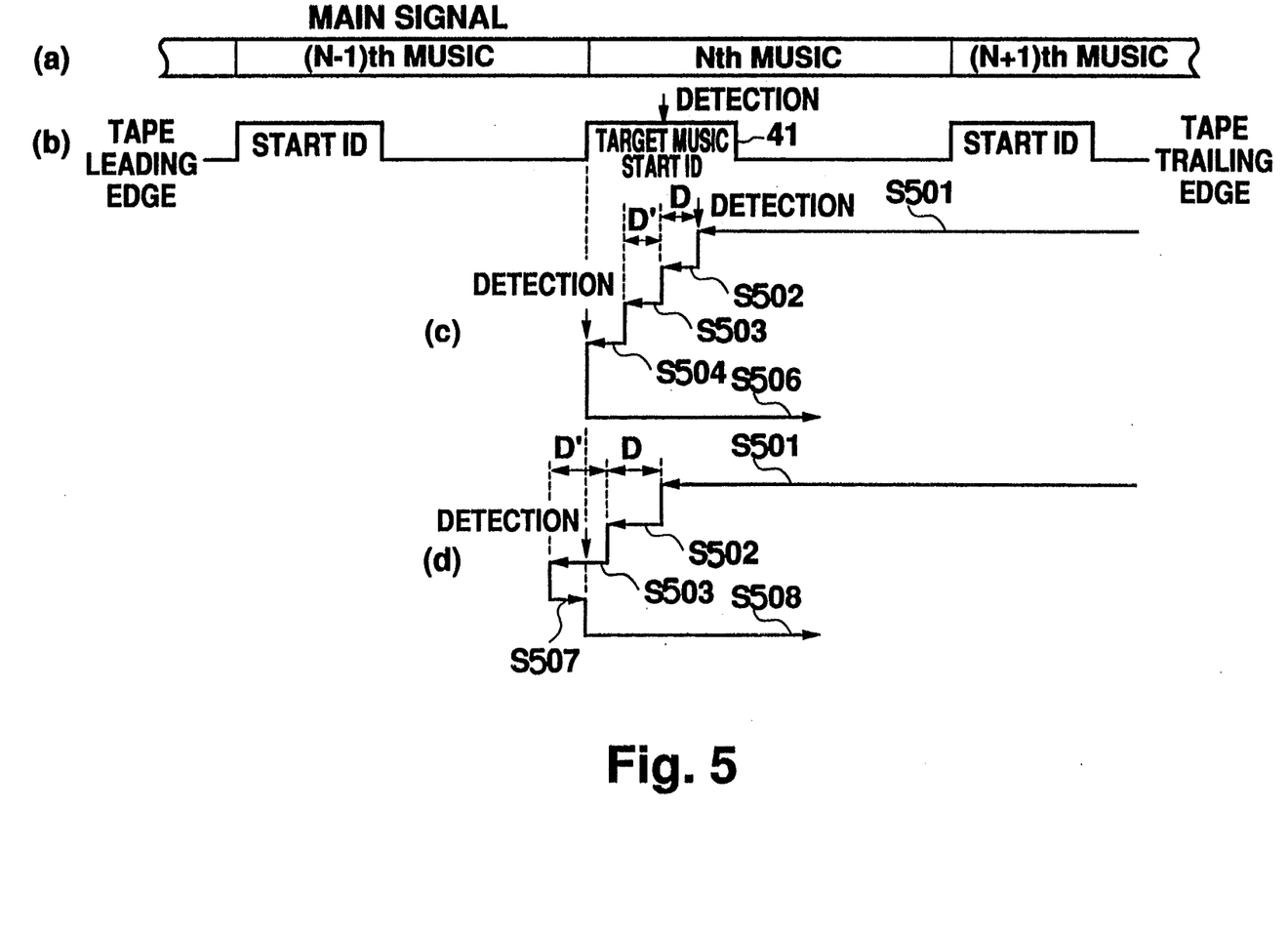
FIG. 5 is an explanatory drawing diagramatically illustrating the fast search operation in the rewinding direction in the magnetic tape reproducing apparatus.

FIG. 5 diagramatically illustrates the operations at the time of the fast search in the rewinding direction. Herein also, description will be made of the case where the N-th program stored on the magnetic tape 12 is a target of the high-speed search.

A start ID is first detected while rewinding the magnetic tape 12 at a speed 200 times the ordinary tape running speed. In this case, a target start ID 41 is detected at a position beyond the trailing edge thereof since the ID is caused to overrun due to the high running speed of the tape relative to the rotational speed of the rotary drum (FIG. 5C, 5D: Step S 501). This detection brings about a braking action onto the feed reel 14 and the take-up reel 15 to thereby stop the tape after additional running by a determined distance D (Step S 502). At that time, the additional running distance D required for the tape to come to rest after the detection of the start ID is measured by the microcomputer 27 (FIG. 1) in compliance with reel pulses from sensors 16 and 17.

Afterwards, the magnetic tape 12 is rewound by the distance D' in a reverse mode at a speed about 10 times the ordinary reproducing speed (Step S 503). It should be noted that this operation is compulsorily performed without the detection of the start ID, in accordance with the reel pulses from the sensors 16 and 17.

After the rewinding of distance D', the processing is followed by two different procedures. That is, if the position of the tape lies within the range of the start ID 41 at the completion of the compulsory rewinding of the distance D' as shown in FIG. 5C, then the operation detecting the start ID is resumed to continue the rewinding while still in the reverse mode (Step S 504). Upon the detection of the leading edge of the start ID, the magnetic tape 12 comes to rest. The initiation point of the start ID 41 is thus found, and then the reproducing operation is carried out (506). The detection of the leading edge of the start ID can be reliably effected due to a relatively low rewinding speed of the order of 10 times499 the ordinary tape running speed as described hereinbefore.

While on the contrary, if the position of the tape lies beyond the range of the start ID 41 at the completion of the compulsory rewinding of the distance D' as shown in FIG. 5D, in other words, if the tape has passed through the section of the start ID 41, the rewinding operation terminates and is switched into a cue mode in which the tape is transferred in the reproducing direction at the same speed as in the above-mentioned reverse mode (Step S 507). Furthermore, when the leading edge of the start ID 41 is detected during this cue forwarding operation, the reproducing operation is initiated from that point (Step S 508). The tape running speed in the cue mode is also relatively low, which is in the order of ten times the ordinary reproducing speed, and accordingly the leading edge of the start ID can be securely detected.

Figure 6:
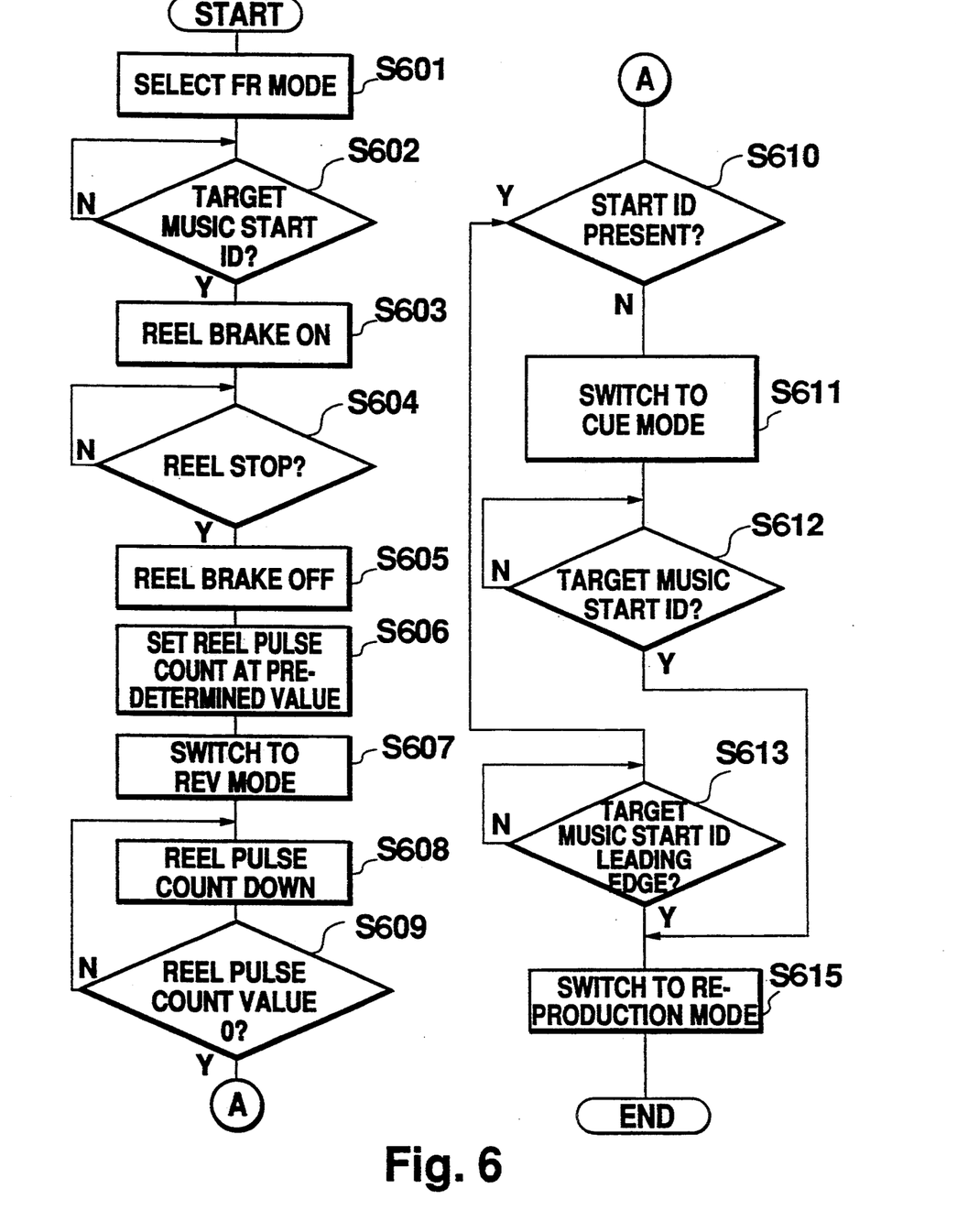
FIG. 6 is a flowchart for detailing the fast search operation in the rewinding direction in the magnetic tape reproducing apparatus.

The above operation will be further explained in detail with reference to FIG. 6. When a desired program number is input through a numerical key pad 35 provided on a console 33 (FIG. 2) and then the FR key is depressed (Step S 601), the microcomputer 27 (FIG. 1) detects it and initiates a 200-times speed search (FR search) in the rewinding direction. During this operation, the microcomputer 27 executes the detection of the target start ID 41 by means of a sub-code detector 26 (Step S 602). If the start ID 41 is detected (Step S 602; Y), then the microcomputer 27 actuates a reel brake not shown (Step S 603) and a counter not shown commences to count the number of reel pulses transmitted in accordance with the speed of rotation of the reel from the sensors 16 and 17 (Step S 604).

When the rotation of the feed reel 14 and the take-up reel 15 stops to bring the running of the magnetic tape 12 to an end (Step S 604; Y), the microcomputer releases the reel brake (Step S 605) and sets the counter not shown at a predetermined value (Step S 606).

Subsequently, the microcomputer 27 switches its mode into a reverse mode executing the rewinding at a speed about ten times the ordinary reproducing speed (Step S 607) to thereby start the rewinding operation of the tape. Then, the microcomputer 27 decreases one by one the above-described counted value being stored in the counter each time a reel pulse is input from the sensors 16 and 17 thereinto (Step S 608), and allows the tape to be rewound until the value of the counter reaches "0" (Step S 609; Y). At that time, the start ID 41 is not detected as described above. In other words, the rewinding of the magnetic tape 12 is compulsorily effected by the distance D (FIG. 5c, d) corresponding to the value being stored in the counter, thereby removing any looseness of the tape which may take place at the stoppage of the tape and ensuring a stable contact of the tape with respect to the rotary drum and the rotary head 11 (FIG. 1).

At the time when the value of the counter reaches "0", the microcomputer 27 determines whether or not there is present a start ID input from a sub-code detector 26, in other words, the position of the tape lies within the section of the start ID 41 (Step S 610).

Consequently, if the position of the tape lies within the section of the start ID 41 (Step S 610; Y), then the detection of the leading edge (which means a fall of the signal in this case) of the start ID is initiated while continuing the rewinding operation in the reverse mode.

When the leading edge of the start ID 41 is thus detected (Step S 613; Y), the tape comes to a stop. Moreover, the microcomputer 27 switches its mode into the reproducing mode (Step S 615) to initiate the reproduction.

On the contrary, at the time when the value of the counter reaches "0" (Step S 609; Y), if the position of the tape lies outside the section of the start ID 41 (Step S 610; N), the microcomputer switches its mode into a cue forwarding mode (Step S 611) to initiate the detection of the leading edge (which means a rise of the signal in this case) of the start ID. When the leading edge of the start ID 41 is thus detected (Step S 612; Y), switching into the reproducing mode takes place (Step S 615) to initiate the reproduction.

According to the present invention as described hereinabove, the magnetic tape is compulsorily rewound by a predetermined distance at a lower speed to initiate the detection of the leading edge of the start ID after the stop of the tape reel due to the detection of the start ID during the fast search in the reproducing or rewinding direction. Therefore, the leading edge of the start ID can be detected after restoring a stable contact state from an unstable contact state which may be brought about between the head and the tape immediately after the stoppage of the tape reel, which advantageously results in a secure search for the leading edge of the target program and prevention of the malfunction as is often seen in the prior art.

What is claimed is:

1. An apparatus for advancing a magnetic tape including at least one piece of program information and including start information recorded over a predetermined interval for respective program information to indicate a leading edge or an initiation point of the program information, comprising:

a high-speed feed means for feeding said magnetic tape in a reproducing direction at a high first tape running speed;

a rewinding means for rewinding said magnetic tape in the reverse direction to the reproducing direction at a second tape running speed lower than the high first tape running speed;

a detection means for detecting start information from said magnetic tape and for indicating the presence or absence of the start information;

a tape stop means for stopping the running of said magnetic tape when the start information is detected by said detection means during the high-speed feed of the magnetic tape caused by said high-speed feed means in the reproducing direction;

an overrun distance measuring means for measuring an overrun distance required for said magnetic tape to come to rest after the detection of said start information; and a tape running control means for issuing to said rewinding means and said detection means after the stop of said magnetic tape caused by means of said tape stop means instructions to compulsorily rewind said magnetic tape by at least said overrun distance, and then if said detection means indicates start information is present for issuing instructions to rewind said magnetic tape and repeatedly issuing instructions to said detection means to detect start information as long as said detection means indicates start information is present, so as to rewind said magnetic tape up to the leading edge of the start information.

2. An apparatus for reproducing information from a magnetic tape according to claim 1, wherein said first tape running speed caused by said high-speed feed means is in the order of 200 times the ordinary reproducing speed.

3. An apparatus for reproducing information from a magnetic tape according to claim 1, wherein said second tape running speed caused by said rewinding means is in the order of 10 times the ordinary reproducing speed.

4. An apparatus for reproducing information from a magnetic tape according to claim 1, wherein said overrun distance measuring means includes a sensor for transmitting pulses whose number depends on the speed of rotation of the feed reel or of the take-up reel for the magnetic tape, and a counter for counting said number of pulses.

5. An apparatus for reproducing information from a magnetic tape according to claim 1, wherein said tape running control means is a microcomputer.

6. The apparatus of claim 1 further including magnetic heads for reproducing information from the magnetic tape.

7. An apparatus for rewinding a magnetic tape including at least one piece of program information and including start information recorded over a predetermined interval for respective program information so as to indicate a leading edge or an initiation point of the program information, comprising:

high-speed rewinding means for rewinding said magnetic tape in the reverse direction to a reproducing direction at a first tape running speed;

low-speed rewinding means for rewinding said magnetic tape in the reverse direction to the reproducing direction at a second tape running speed lower than the first tape running speed;

low-speed feed means for feeding said magnetic tape in the reproducing direction at a tape running speed substantially equal to that of said low-speed rewinding means;

detection means for detecting start information from said magnetic tape and for indicating the presence or absence of the start information;

tape stop means for stopping the running of said magnetic tape when the start information is detected by said detection means during the high-speed rewinding of said magnetic tape caused by said high-speed rewinding means; and tape running control means for issuing to said low-speed rewinding means and said detection means an instruction to compulsorily rewind said magnetic tape for a predetermined distance from the position of the stop caused by said tape stop means, and for instructing said low-speed rewinding means to rewind said magnetic tape if said detection means indicates start information is present and repeatedly issuing instructions to said detecting means to detect start information as long as said detection means indicates start information is present so as to rewind said magnetic tape up to the leading edge of the start information and for instructing said low-speed feed means to transfer said magnetic tape if said detection means indicates start information is absent and repeatedly issuing instructions to said detecting means to detect start information as long as said detection means indicates start information is absent so as to transfer said magnetic tape up to the leading edge of said start information.

8. An apparatus for reproducing information from a magnetic tape according to claim 7, wherein said first tape running speed caused by said high-speed rewinding means is in the order of 200 times the ordinary reproducing speed.

9. An apparatus for reproducing information from a magnetic tape according to claim 7, wherein said second tape running speed caused by said low-speed rewinding means is in the order of 10 times the ordinary reproducing speed.

10. An apparatus for reproducing information from a magnetic tape according to claim 7, further comprising means including a sensor for transmitting pulses whose number depends on the speed of rotation of the feed reel or the rewinding reel for said magnetic tape, and a counter for counting said number of pulses for measuring said predetermined distance when said magnetic tape is compulsorily rewound without any detection of the start information for a predetermined distance.

11. An apparatus for reproducing information from a magnetic tape according to claim 7, wherein said tape running control means is a microcomputer.

12. The apparatus of claim 7 further including magnetic heads for reproducing information form the magnetic tape.

13. An apparatus for forwarding a tape, wherein the tape includes data sets, each data set having starting data, the apparatus comprising:
a control unit;
at least one magnetic head, operatively connected to said control unit, for receiving information from the magnetic tape;
a feed reel, operatively connected to said control unit;
a take-up reel, operatively connected to said control unit;
sensors, operatively connected to said control unit, receiving signals from said reels;
wherein the control unit includes means
for initiating the stopping of said reels when said at least one magnetic head indicates the existence of start data;
for determining a traveled distance of the tape in response to the signals received from the sensors during the stopping of the magnetic tape;
for controlling the rewinding of the tape for the traveled distance; and
for controlling the rewinding of the tape immediately after the rewinding of the tape for the traveled distance when said at least one magnetic head indicates the existence of start data and as long as said at least one magnetic head indicates the existence of start data and for controlling the forwarding of the tape immediately after the rewinding of the tape for the traveled distance when said at least one magnetic head indicates the absence of start data as long as said at least one magnetic head indicates the absence of start data.

14. An apparatus for rewinding a tape, wherein the tape includes data sets, each data set having starting data, the apparatus comprising:
a control unit;
at least one magnetic head, operatively connected to said control unit, for receiving information from the magnetic tape;
a feed reel, operatively connected to said control unit;
a take-up reel, operatively connected to said control unit;
sensors, operatively connected to said control unit, receiving signals from said reels;
wherein the control unit includes means
for initiating the stopping of said reels when said at least one magnetic head indicates the existence of start data;
for controlling the rewinding of the tape for a predetermined distance; and
for controlling the rewinding of the tape immediately after the rewinding of the tape for the predetermined distance when said at least one magnetic head indicates the existence of start data and as long as said at least one magnetic head indicates the existence of start data and for controlling the forwarding of the tape immediately after the rewinding of the tape for the predetermined distance when said at least one magnetic head indicates the absence of start data as long as said at least one magnetic head indicates the absence of start data.

15. A method for fast forwarding a tape in a reproducing apparatus including at least one head for contacting the tape and reproducing signal information from the tape, the tape including program information, the program information having start information, the method comprising:
(a) fast forwarding the tape;
(b) determining whether start information exists on the tape where the magnetic head contacts the tape;
(c) stopping the tape when it is determined that start information exists on the tape;
(d) measuring a traveled distance of the tape during step (c);
(e) rewinding the tape by the traveled distance;
(f) determining whether start information exists on the tape where the magnetic head contacts the tape;
(g) rewinding the tape while determining whether start information exists on the tape where the magnetic head contacts the tape as long as start information exists on the tape where the magnetic head contacts the tape, if it is determined in step (f) that the start information exists on the tape where the magnetic head contacts the tape; and
(h) forwarding the tape while determining whether start information exist on the tape where the magnetic head contacts the tape as long as start information is absent from the tape where the magnetic head contacts the tape, if it is determined in step (f) that the start information is absent on the tape where the magnetic head contacts the tape.

16. A method for fast rewinding a tape in a reproducing apparatus including at least one head for contacting the tape and reproducing signal information from the tape, the tape including program information, the program information having start information, the method comprising:
(a) rewinding the tape;
(b) determining whether start information exists on the tape where the magnetic head contacts the tape;
(c) stopping the tape when it is determined that start information exists on the tape;
(d) rewinding the tape by a predetermined distance;

(e) determining whether start information exists on the tape where the magnetic head contacts the tape;

(f) rewinding the tape while determining whether start information exists on the tape where the magnetic head contacts the tape as long as start information exists on the tape where the magnetic head contacts the tape, if it is determined in step (e) that the start information exists on the tape where the magnetic head contacts the tape; and (h) forwarding the tape while determining whether start information exist on the tape where the magnetic head contacts the tape as long as start information is absent from the tape where the magnetic head contacts the tape, if it is determined in step (e) that the start information is absent on the tape where the magnetic head contacts the tape.

* * * * *